United States Patent [19]

Phillipps et al.

[11] Patent Number: 4,468,678

[45] Date of Patent: * Aug. 28, 1984

[54] SYSTEM FOR CONTROLLING A STRIP CHART RECORDER

[75] Inventors: Patrick G. Phillipps, Cheshire; William G. Fairchild, Wallingford, both of Conn.

[73] Assignee: American Home Products Corporation, New York, N.Y.

[*] Notice: The portion of the term of this patent subsequent to Aug. 2, 2000 has been disclaimed.

[21] Appl. No.: 446,750

[22] Filed: Dec. 3, 1982

Related U.S. Application Data

[62] Division of Ser. No. 229,237, Jan. 28, 1981, Pat. No. 4,396,922.

[51] Int. Cl.³ .............................................. G01D 15/24
[52] U.S. Cl. ................................................. 346/139 R
[58] Field of Search .................. 346/139 R, 76 R, 68, 346/116, 117, 65, 62

[56] References Cited

U.S. PATENT DOCUMENTS

| | | | |
|---|---|---|---|
| 1,358,896 | 11/1920 | Thwing | 346/140 R |
| 2,134,581 | 10/1938 | Rowell | 346/62 X |
| 2,141,975 | 12/1938 | Finch | 346/139 A X |
| 2,724,631 | 11/1955 | Ruhland | 346/49 |
| 4,396,922 | 8/1983 | Phillipps | 346/139 R X |

Primary Examiner—Joseph W. Hartary
Attorney, Agent, or Firm—Edward M. Blocker

[57] ABSTRACT

A system for selectively removing a recording means from a strip chart scale to avoid marking undesired data thereon.

4 Claims, 2 Drawing Figures

SYSTEM FOR CONTROLLING A STRIP CHART RECORDER

This is a division of application Ser. No. 229,237, filed Jan. 28, 1981, now U.S. Pat. No. 4,396,922.

BACKGROUND

The present invention relates to a system and method for controlling the recording of data on a strip chart to avoid recording undesired data.

Strip chart recorders find use, inter alia, as trend recorders for physiologic data, such as heart rate. Due to the simultaneous detection of the desired physiologic signal and interfering signals, monitoring equipment will at times produce unreliable data. Signal processing techniques often enable the detection and elimination of such unreliable data.

However, when the data is being recorded on a strip chart as a trend record, it is often necessary to cease recording when data fails to be a reliable indicator of bodily function. Various techniques have been adopted for this purpose. For example, an active mechanical device can be added to the recorder to lift the pen from the strip chart. Such devices add substantial expense and complexity to the recorder.

Another technique utilizes thermal pens with short time constants, so that the heating current is turned off and no recording made while the data is unreliable. However, it is necessary to maintain the heated surface of the pen as small as possible to achieve a sufficiently short thermal time constant, and in most recorders, the pen sweeps in an arc over a knife edge to print on the strip chart paper drawn over the edge. It is, therefore, necessary to add an expensive articulating mechanism to convert this arcuate motion to a linear motion of the pen over the knife edge to maintain the thermally active section of the pen on the strip chart paper. Moreover, should the pen become misaligned with the knife edge, no recording would be made.

Yet another technique in use simply drives the pen off the scale of the strip chart at the limited slew rate at which data is recorded and holds it there until reliable data is once again available. This produces a succession of lines on the paper which are distracting and render it difficult to determine the significance of the reliable data which has been recorded.

SUMMARY

In accordance with one aspect of the present invention, a system is provided for selectively removing a recording means from a strip chart scale to avoid marking undesired data thereon. Means are included for rapidly moving the recording means off the scale in response to an undesired data signal; and means are included for separating the recording means from the strip chart in response to the motion of the recording means off the scale.

In a preferred embodiment, the separating means comprises converting means for converting the motion of the recording means off the scale to a motion of the recording means from the strip chart. Accordingly, the need for an expensive active mechanical device to lift the recording means from the strip chart is avoided. Preferably, the converting means is implemented as a ramp inclined at an angle to the strip chart and positioned to intercept the recording means as it moves off the scale. The ramp thus acts as a cam surface to deflect the recording means from the strip chart.

In a further preferred embodiment, the means for rapidly moving the recording means off the scale in response to the undesired data signal comprises driver means operative in response to a drive signal to move the recording means through a range extending off the strip chart scale and means for coupling a rapid motion signal to the driver means as the drive signal in response to the undesired data signal. The position of the recording means within the range of the driver means is proportional to a characteristic of the drive signal, and the rapid motion signal has a characteristic causing the driver means to rapidly move the recording means to a position off the scale. This embodiment can be implemented inexpensively using a standard high speed galvanometer driver as the driver means, while providing the drive signal thereto through an electronic switch under the control of the undesired data signal.

In the absence of the undesired data signal, the switch provides a data signal to the driver means as the drive signal for the recording of data. In the presence of the undesired data signal, the switch provides the rapid motion signal to the driver means as the drive signal to rapidly move the recording means off the strip chart scale.

DESCRIPTION OF CERTAIN PREFERRED EMBODIMENTS

Figure 1:
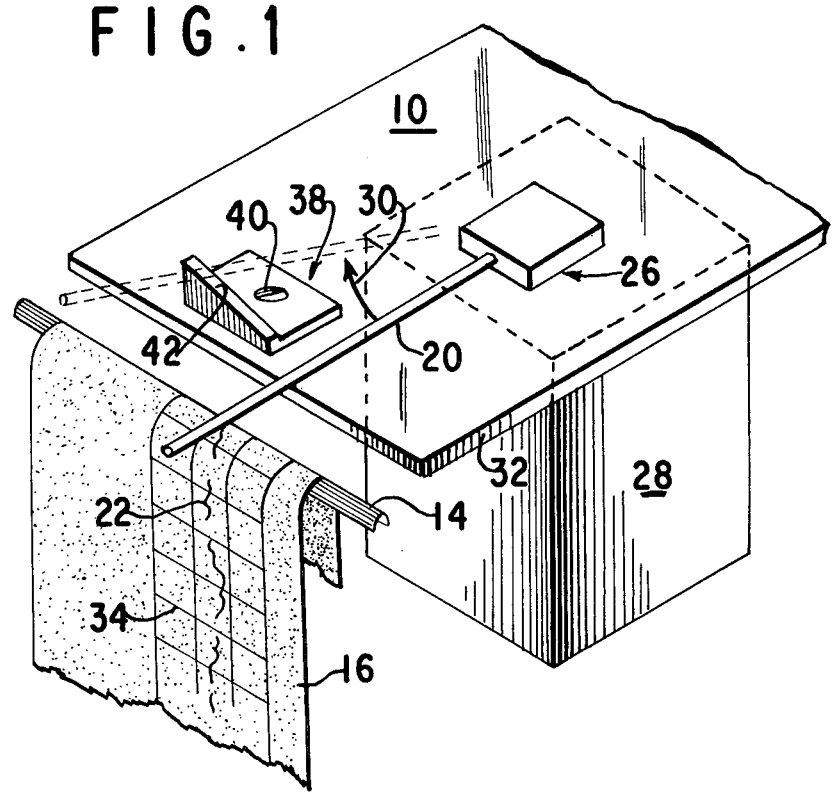
FIG. 1 is a perspective view of a portion of a strip chart recorder, in accordance with one aspect of the present invention.

With reference first to FIG. 1, a strip chart recorder 10 is shown having a knife edge 14 over which a strip chart 16 made of thermal recording paper is drawn at a constant time rate by a driven roller (not shown). A heated pen 20 contacts the strip chart 16 as it passes over the knife edge 14 to create a trend record 22 on the strip chart 16 through heating.

The pen 20 is affixed to a pen holder 26 of a galvanometer driver 28. Galvanometer driver 28 is affixed to a chassis 32 to maintain driver 28 in fixed relation to knife edge 14. Pen holder 26 is operative to rotate through an arc (as indicated by arrow 30) in response to the application of a drive signal to driver 28, the angular position of holder 26 being proportional to a characteristic of the drive signal.

Accordingly, the position of pen 20 with respect to the strip chart 16 and a strip chart scale 34 printed on a portion of its surface, is determined by the drive signal to galvanometer driver 28.

At such times during the making of a trend record that reliable data is unavailable, it is necessary to cease writing the trace on scale 34. This is achieved in accordance with one aspect of the present invention by rapidly deflecting pen 20 in the direction of arrow 30 and off the scale 34. Where a thermal pen is used, the deflection of pen 20 is made sufficiently rapid that no marking of the paper occurs. A deflecting member 38, affixed to chassis 32 by a fastener 40, is provided with a cam surface in the form of a ramp 42 inclined at an angle to strip chart 16. Ramp 42 is positioned to intercept pen 20 as it moves off scale 34 and deflect pen 20 from strip chart 16 to a position on ramp 42 separated from strip chart 16, as shown in phantom lines. Accordingly, ramp 42 serves to convert the motion of pen 20 off scale 34 and parallel to strip chart 16 to a motion of pen 20 from strip chart 16. Pen 20 is maintained in this position separated from strip chart 16 until reliable data is once again available, whereupon pen 20 will be deflected back onto the scale 34 to continue the trend record.

Pen 20 is biased toward knife edge 14 by a spring (not shown) exerting a force equivalent to that exerted by a mass of approximately four or five grams to maintain pen 20 against strip chart 16 during recording. Preferably, ramp 42 is positioned to intercept pen 20 at its center of mass to prevent pen 20 from bouncing back to strip chart 16, and thus marking it, upon the impact of pen 20 on ramp 42.

The ramp 42 preferably is made of a low friction material which is not adversely affected by the heat of pen 20. Suitable materials for ramp 42 include polytetrafluoroethylene, such as materials sold under the trademarks Teflon and Rulan J. A material sold under the trademark Delrin, a linear polyoxymethylene-type acetal resin, is also suitable.

Figure 2:
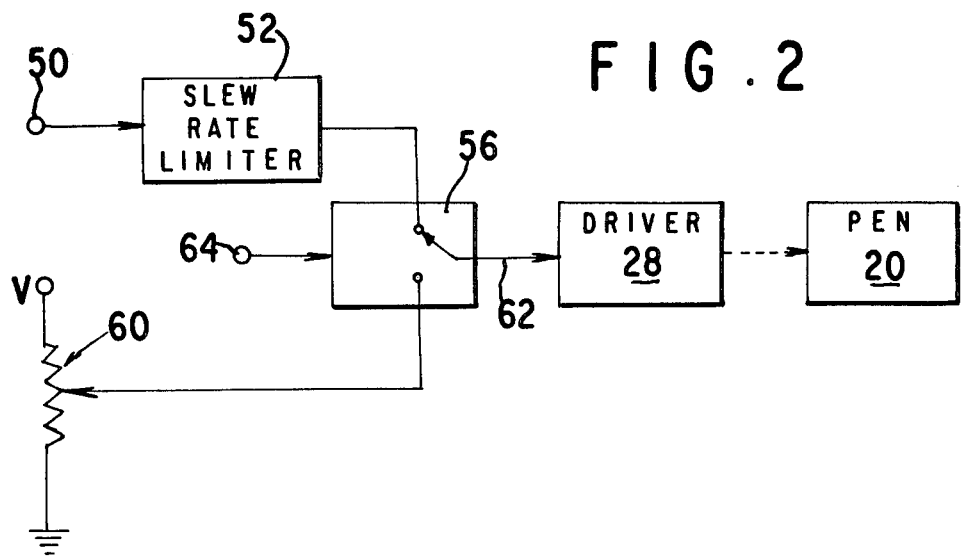
FIG. 2 is a block diagram of a circuit for use with the strip chart recorder of FIG. 1, in accordance with another aspect of the present invention.

FIG. 2 presents a block diagram of a circuit controlling the drive signal provided to galvanometer driver 28. The data signal to be recorded is received at an input terminal 50 of a slew rate limiting circuit 52. Circuit 52 may comprise, for example, a series resistor (not shown) connected at one terminal to input terminal 50 and at the other terminal to a capacitor (not shown) having its second terminal grounded. The output of slew rate limiting circuit 52 is taken from the junction of the resistor and capacitor. Accordingly, the signal appearing at the output of circuit 52 will be constrained to vary effectively below a predetermined slew rate. This rate is selected to ensure that the position of pen 20, as controlled by the data signal provided to terminal 50, will not change so abruptly as to create a gap in the trend record.

The output of circuit 52 is connected to a first input terminal of a single pole, double throw electronic switch 56. The second input terminal of switch 56 is connected to the sweep arm of a potentiometer 60 having one fixed terminal connected to ground and the second fixed terminal connected to a source of DC voltage V. The output terminal 62 of switch 56 is connected to galvanometer driver 28 to provide the drive signal thereto.

Switch 56 also has a control terminal 64 to which a control signal is provided in the event that the data signal on terminal 50 is unreliable or absent. Switch 56 normally connects its first input terminal to its output terminal in the absence of an undesired data signal so that the data signal on terminal 50 is permitted to control the making of the trend record by pen 20 through driver 28. However, upon the provision of an undesired data signal output terminal in response to the control signal 62 abruptly switches to the second input terminal providing the voltage appearing on the wiper arm of potentiometer 60 to driver 28 as the drive signal. This voltage is selected as a value which will drive pen 20 rapidly off scale 34 in the direction of arrow 30. Since the transition to this voltage is not slew rate limited, pen 20 is enabled to sweep over the strip chart sufficiently rapidly to avoid marking it. Upon the termination of the undesired data signal, the output terminal 62 abruptly switches back to the signal provided at the output of circuit 52, causing pen 20 to rapidly sweep back onto scale 34 and continue the trend record.

As an alternative, the functions performed by slew rate limiting circuit 52, electronic switch 56 and potentiometer 60 can be implemented in firmware by a microprocessor providing the drive signal in binary format to a digital-to-analog converter. The analog output of the converter is then provided to galvanometer driver 28 as the drive signal. The function of circuit 52 can be implemented, for example, by incrementing or decrementing the binary drive signal at a limited rate under the control of the microprocessor.

Having described in detail certain preferred embodiments of the present invention, it is to be understood that the present invention is not limited to these precise embodiments and that obvious changes and modifications can be effected therein by one skilled in the art without departing from the spirit and scope of the invention as defined in the appended claims.

We claim:

1. A system for making a trend record of time dependent data on a recording scale of a strip chart comprising:

recording means which include a marking device operable for travelling over and beyond the recording scale of the strip chart in response to an input signal supplied to said marking device;

means for drawing the strip chart past the recording means;

means for selecting between said time dependent data and a further signal in response to a control signal which is indicative of the reliability of said time dependent data and supplying said selected signal as said input signal to said marking device such that said marking device in response to said further signal as said input signal rapidly travels over and beyond the recording scale of said strip chart so as to avoid marking said strip chart; and means for separating said marking device from said strip chart in response to said marking device travelling beyond the recording scale of said strip chart.

2. The system of claim 1, wherein the separating means comprises converting means for converting the motion of the marking device off the scale to a motion of the marking device from the strip chart.

3. The system of claim 2, wherein the converting means is a cam surface positioned to intercept the marking device as it moves off the scale and shaped to deflect the marking device from the strip chart as the marking device moves over the cam surface.

4. The system of claim 3, wherein the cam surface is a ramp inclined at an angle to the strip chart.

* * * * *